June 19, 1934.    J. E. MITCHELL    1,963,241
COTTON CLEANING AND RECLAIMING MACHINE
Filed Dec. 14, 1931
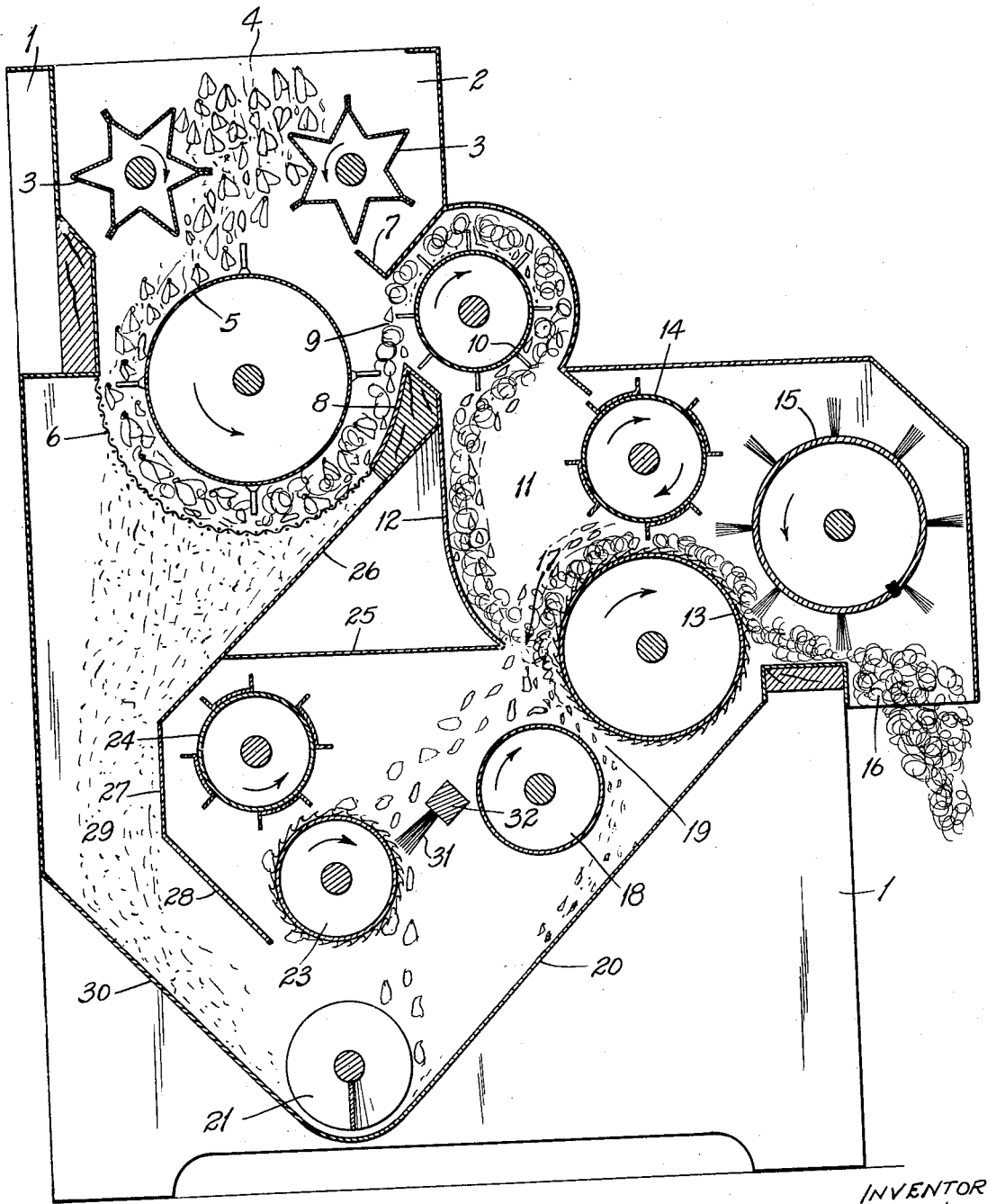
INVENTOR:
JOHN E. MITCHELL.
BY Bruce S. Elliott
ATTORNEY.

Patented June 19, 1934

1,963,241

UNITED STATES PATENT OFFICE 1,963,241

COTTON CLEANING AND RECLAIMING MACHINE

John E. Mitchell, Dallas, Tex.

Application December 14, 1931, Serial No. 580,843

6 Claims. (Cl. 19—37)

The general object of the present invention is to provide means for separating the product escaping past the saw cylinder of a cotton cleaning machine into two streams, one of which, containing the fine trash, passes by the saw cylinder and is discharged from the machine, and to provide means for reclaiming the locks of cotton mixed with the coarser hull particles of the second stream and for returning the reclaimed cotton directly to the saw cylinder of the cotton cleaning machine.

Stated in detail, an object of the invention is to provide a cotton cleaning machine in which a rotary member is positioned below the escape opening between the lower end of the hull board and the saw cylinder, and in such proximity to the latter as to provide a space large enough to permit the passage of fine trash passing through said opening, but small enough to prevent the passage of coarser hull particles and locks of cotton; to rotate said rotary member in the same direction as the saw cylinder and to position it at such a distance below the axial center of the saw cylinder as to permit the coarser hull particles escaping through said opening, together with locks of cotton not engaged by the saw teeth, to be knocked back by impact of the teeth of the saw cylinder therewith through a space provided above said rotary member; and to provide means for reclaiming the cotton knocked back by the saw cylinder and returning it directly to the cotton cleaning machine.

A further object of the invention is to provide cotton reclaiming mechanism for receiving the coarser hulls and locks of cotton knocked back by the saw cylinder above said rotary member, said cotton reclaiming mechanism including as elements a reclaiming saw cylinder and a doffer cooperating therewith, the latter operating to return directly to the saw cylinder of the cotton cleaning machine the cotton doffed from the reclaiming saw cylinder.

In my pending application, Serial No. 464,560, filed June 28, 1930, I have illustrated mechanism, and claimed a method of procedure, in which a battery of cotton cleaning machines is illustrated, in each of which the product escaping past the saw cylinder from the hull board is divided into two streams exactly in the manner of the machine of this present application, but all the streams containing cotton of value are conducted to a single cotton reclaiming machine, and the recovered cotton then returned to the distributor supplying the battery of machines.

The invention is illustrated in the accompanying drawing, in which the view is a longitudinal sectional view through a combined cotton cleaning and cotton reclaiming machine constructed and operating in accordance with my invention.

Referring now to the drawing, the numeral 1 indicates, generally, the casing of my machine, in an upper projecting portion, 2 of which is arranged a pair of feed rollers 3, located below an opening 4, through which the seed cotton is fed into the machine. Located immediately below the feed rollers 3 is a rotatable beater roll or threshing cylinder 5, which is partly enclosed on its lower side by a screen 6, through which a certain amount of dirt and trash will pass as the cotton is carried over the screen by the cylinder 5. At one side the cylinder 5 is partly enclosed by casing sections 7, 8, which provide an opening 9, and rotatably mounted in proximity to the opening 9 is a picker roll 10, which operates to remove the cotton and hulls through the opening 9 and discharge them downwardly into a working chamber 11, one side of which is formed by a hull board 12. On the other side of this working chamber is mounted a saw cylinder 13 and a cooperating kicker roll 14. Cooperating with the saw cylinder 13 is also a doffing cylinder 15, which operates to remove cotton from the saw cylinder and discharge it through an opening 16, whence it passes into a gin, which the machine illustrated is adapted to be mounted on.

The lower end of the hull board 12 defines the size of an opening 17 past the saw cylinder for the escape of hulls and trash, and such locks or wads of cotton as may not be engaged by the teeth of the saw cylinder.

As is now well known, it is impracticable to make the opening 17 small enough to prevent the escape of cotton past the saw cylinder, as, in such event, large hull particles and unopened bolls will be prevented from escaping from the working chamber 11, with the result that the latter will soon become congested.

In making the opening 17 large enough, therefore, to permit the free escape of unopened bolls and large hull particles, it is inevitable that a considerable quantity of cotton will also escape through said opening along with the hulls and unopened bolls, and it is the principal purpose of my invention to recover such escaping cotton, which is usually in the form of relatively small and hard wads or locks, in a comparatively clean condition, that is, unmixed with fine trash and hull particles.

Prior to my invention, and in fact in prior machines invented by me, the entire product escaping through the opening 17 has been treated in a separate machine, or by additional cleaning mechanism in the same machine, to recover the cotton. This method of procedure, however, has been found impracticable, because so much sand, dirt and fine trash escapes past the saw cylinder along with the cotton and coarser hull particles, that when the whole product is treated, the recovered cotton contains so much of this fine trash as to impair its value, and hence it can not be combined with the main body of cotton extracted by the saw cylinder of the cleaning machine, which is quite clean.

In order to enable the escaping cotton to be recovered or reclaimed in a relatively clean condition, I have devised the present improvements, in the operation of which the fine trash escaping with the coarser hulls and cotton through the opening 17 is immediately separated from the remainder of the product, and only the coarser hull particles and small locks of cotton are involved in the reclaiming operation.

In the accomplishment of this purpose I mount adjacent to the lower portion of the saw cylinder 13 a rotary member 18, which may be in the form of a smooth-surface cylinder, which is positioned substantially directly below the opening 17 and in sufficiently close proximity to the surface of saw cylinder 13 to provide a space 19 between them wide enough to permit the passage therethrough of sand, dirt, small hull particles and other fine trash, but narrow enough to prevent the escape of small locks of cotton. The rotary member 18 is rotated in the same direction as the saw cylinder 13, so that the products passing through opening 17 and falling thereon will be directed toward the saw cylinder, the fine trash immediately passing through the space 19 and falling on an inclined portion 20 of the casing, whence it slides into a conveyor 21 and is discharged from the machine. Thus a complete separation of the fine trash from the coarser hull particles and small locks of cotton is immediately effected. A certain proportion of the locks of cotton escaping through the opening 17, being carried to the narrow passage 19 by the rotary member 18, will be engaged by the teeth of saw cylinder 13 and carried through to the doffer. Other locks of cotton not so engaged, and the coarser hull particles, will be knocked over the upper side of the rotary member 18 by impact of the teeth of the saw cylinder 13; rotary member 18 being positioned at a sufficient distance below the axial center of the saw cylinder 13 to permit of the ready projection of the cotton locks and large hull particles over it. These projected hull particles and cotton locks pass through the lower portion of a space 22 located above the rotary member 18 and extending beyond the same in a direction away from the saw cylinder 13, and this space is confined at its remote end by a reclaiming saw cylinder 23 and a doffer 24 cooperating therewith. At its upper side this space is preferably confined by a flat casing member 25, which extends from the lower edge of the hull board 12 to an interior casing member 26 which, with connected casing sections 27 and 28, partly enclose the reclaiming saw cylinder and its doffer, and at the same time provide a space 29 through which the dirt and trash passing through the screen 6 may pass to an inclined wall 30 of the casing and thence to conveyor 21. The axis of the reclaiming saw cylinder 23 is located well below the axis of the rotary member 18 so that the trajectory of the hulls and locks of cotton projected through the space 22 by the saw cylinder 13 will terminate on the upper side of said reclaiming saw cylinder. Cooperating with the reclaiming saw cylinder 23 is a line of brushes 31 mounted in a bar 32, which is secured at its ends in the side walls of the machine.

In the operation of the machine as described the seed cotton, that is, the harvested or picked cotton mixed with hulls and other trash fed into the machine, has a portion of sand, dirt and very fine trash removed by being passed over the picker roller screen 6, and is delivered by the picker roller 10 into the working chamber 11. The major portion of the cotton entering said chamber is engaged by the teeth of the saw cylinder 13, carried up beneath the kicker roller 14, which knocks back into the chamber adhering hull particles, and is doffed from the saw cylinder by the doffer 15. This cotton passes through opening 16. Hull particles, fine trash, and small locks of cotton not engaged by the teeth of the saw cylinder 13, escape through the opening 17 and fall upon the rotary member 18 and are continually moved thereby into proximity to the saw cylinder 13. The finer hull particles and other small trash immediately pass through the opening 19 and thence to the conveyor 21, and are discharged from the machine. Some of the small locks of cotton falling in the space between the saw cylinder and the rotary member 18 or being carried thereto by the rotation of said member will be engaged by the teeth of the saw cylinder and carried up through the working chamber 11 and beneath the kicker roll 14. Other locks of cotton, together with the coarser hull particles, will be knocked back over the rotary member 18 by impact of the teeth of the rapidly revolving saw cylinder 13, and will be projected through the space 22, and fall upon the reclaiming saw cylinder 23. This saw cylinder is relatively small in diameter, as compared with the main saw cylinder 13, and its teeth will readily engage the small locks of cotton. This engagement is insured, however, by the locks passing under the brush 31, which forces the locks into firm engagement with the teeth of the saw cylinder. Hull particles will also be carried under the brushes by the reclaiming saw cylinder, but these will promptly be thrown off by centrifugal action, as indicated in the drawing, and will fall into the conveyor 21 to be discharged from the machine. The cotton locks carried under the brushes 31 will then be carried upward and under the doffing cylinder 24, which rotates in a direction opposite to that of the reclaiming saw cylinder 23 and at a higher rate of speed, and hence acts to remove the locks of cotton from the saw cylinder 23 and to project them by impact through the space 22 and onto the saw cylinder 13, by the teeth of which they are readily engaged; or, if not, they will again be thrown back on to the reclaiming saw cylinder to have the above operation repeated and to be ultimately engaged by the teeth of saw cylinder 13. While the paths of these respective products are not, of course, fixed and definite, yet, as a general rule, the hulls and cotton locks impelled by the saw cylinder 13 will traverse a path which is lower than that of the cotton locks impelled by the doffer 24 toward the saw cylinder 13. There is, therefore, roughly speaking, freedom of movement of the respective products. But even if these products traversed substantially the same paths in opposite directions, no particular harm would be done as, owing to the width of the saw cylinder 13, there is not a continuous discharge over the entire surface thereof, the products are comparatively widely dispersed and there would be no material conflict between the movements of the two streams.

The cotton projected back into the cleaning machine by the doffing cylinder 24 will be practically entirely free from admixture of fine trash particles, and can be combined with the cotton removed from the working chamber 11 by the saw cylinder 13 without lowering the grade of the latter.

I claim:

1. In a cotton cleaning machine having a saw cylinder and providing an opening past the same for the escape of hulls, small hull particles and other fine trash, and locks of cotton not engaged by the teeth of the saw cylinder, means located beneath said opening for separating the escaped product into two streams and discharging one of said streams, consisting of the small hull particles and other fine trash, immediately from the machine, means for reclaiming the cotton from the other stream, and means for returning the reclaimed cotton directly to the cleaning mechanism.

2. In a cotton cleaning machine having a saw cylinder and providing an opening past the same for the escape of hulls, small hull particles and other fine trash, and locks of cotton not engaged by the teeth of the saw cylinder, means located beneath said opening for separating the escaped product into two streams and discharging one of said streams, consisting of the small hull particles and other fine trash, immediately from the machine, means for reclaiming the cotton from the other stream, and means for returning the reclaimed cotton directly to said saw cylinder.

3. In a cotton cleaning machine having a saw cylinder and providing an opening past the same for the escape of hulls, small hull particles and other fine trash, and locks of cotton not engaged by the teeth of the saw cylinder, means located beneath said opening for separating the escaped product into two streams and discharging one of said streams, consisting of the small hull particles and other fine trash, immediately from the machine, cotton reclaiming mechanism positioned to receive the other stream, consisting of coarse hull particles and small locks of cotton, and means for returning the cotton reclaimed by said mechanism from said second stream directly to the saw cylinder of the cleaning mechanism.

4. In a cotton cleaning machine having a saw cylinder and providing an opening past the same for the escape of hulls, fine trash, and locks of cotton not engaged by the teeth of the saw cylinder, a rotary member located beneath said opening in spaced relation to the saw cylinder and rotating in the same direction, said rotary member operating to separate the escaped product into two streams and to cause the immediate discharge through the intervening space past the saw cylinder of one of said streams, containing the fine trash and small hull particles, the relative location of parts being such as to permit the coarse hull particles and locks of cotton, constituting the second stream, to be knocked back by the saw cylinder over the top of said rotary member, means for reclaiming the cotton from said second stream, and means for continuously projecting the reclaimed cotton over said rotary member and directly onto the surface of said saw cylinder.

5. In a cotton cleaning machine having a saw cylinder and providing an opening past the same for the escape of hulls, small hull particles and other fine trash, and locks of cotton not engaged by the teeth of the saw cylinder, a rotary member located beneath said opening in working relation to said saw cylinder at the lower portion thereof, rotating in the same direction, and affording a narrow space past the saw cylinder for the escape of the fine trash and small hull particles only, said rotary member, by its position, permitting the coarse hull particles, and small locks of cotton not engaged by the teeth of the saw cylinder, to be knocked back over its top, means for reclaiming the locks of cotton mixed with said coarse hull particles, and means for returning the reclaimed cotton directly to the saw cylinder.

6. In a cotton cleaning machine having a saw cylinder and providing an opening past the same for the escape of hulls, small hull particles and other fine trash, and locks of cotton not engaged by the teeth of the saw cylinder, a rotary member located beneath said opening in working relation to said saw cylinder at the lower portion thereof, rotating in the same direction, and affording a narrow space past the saw cylinder for the escape of the fine trash and small hull particles only, said rotary member, by its position, permitting the coarse hull particles, and small locks of cotton not engaged by the teeth of the saw cylinder, to be knocked back over its top by the saw cylinder, a reclaiming saw cylinder positioned to receive the cotton and hulls so knocked back, and a doffer cooperating with said reclaiming saw cylinder and operating to remove cotton therefrom and to project the same over said rotating member to the surface of said saw cylinder.

JOHN E. MITCHELL.